United States Patent
Wang et al.

(10) Patent No.: US 8,676,434 B2
(45) Date of Patent: Mar. 18, 2014

(54) METHOD AND APPARATUS FOR ENHANCING THE ROBUSTNESS OF A HYBRID VEHICLE TORQUE SECURITY DIAGNOSTIC

(75) Inventors: Wei D. Wang, Troy, MI (US); Harry J. Bauer, Troy, MI (US); Jeffrey David, Milford, MI (US); Wei Ren, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 739 days.

(21) Appl. No.: 12/908,177

(22) Filed: Oct. 20, 2010

(65) Prior Publication Data

US 2012/0101672 A1   Apr. 26, 2012

(51) Int. Cl.
*G06F 11/30* (2006.01)
*G06F 19/00* (2011.01)
*G01M 17/00* (2006.01)
*H03K 23/00* (2006.01)

(52) U.S. Cl.
USPC ....... 701/29.2; 701/29.1; 701/33.5; 701/33.9; 714/706; 377/118

(58) Field of Classification Search
USPC .......... 307/9.1, 149; 377/15, 16, 17; 714/704, 714/706, 708
See application file for complete search history.

(56) References Cited

U.S. PATENT DOCUMENTS

| | | | | |
|---|---|---|---|---|
| 5,902,342 A * | 5/1999 | Mishra | | 701/22 |
| 7,374,513 B2 * | 5/2008 | Whitton | | 477/146 |
| 8,023,235 B2 * | 9/2011 | Bilac et al. | | 361/42 |
| 2005/0116699 A1 * | 6/2005 | Mazda | | 323/283 |
| 2008/0007879 A1 * | 1/2008 | Zaretsky et al. | | 361/42 |
| 2009/0198459 A1 * | 8/2009 | Bilac et al. | | 702/58 |
| 2009/0312898 A1 * | 12/2009 | Hashimoto | | 701/31 |
| 2011/0187184 A1 * | 8/2011 | Ichikawa | | 307/10.1 |
| 2011/0288723 A1 * | 11/2011 | Weiss et al. | | 701/34 |
| 2012/0262180 A1 * | 10/2012 | Ishishita | | 324/430 |

OTHER PUBLICATIONS

Multi-loop Circuits and Kirchhoff's Rules http://physics.bu.edu/~duffy/py106/Kirchoff.html Spring 2007.*
USPTO Scientific and Technical Information Center Search Report, Jul. 23, 2013.*

* cited by examiner

*Primary Examiner* — Fadey Jabr
*Assistant Examiner* — Thomas Ingram
(74) *Attorney, Agent, or Firm* — Quinn Law Group, PLLC

(57) ABSTRACT

A vehicle includes electrical components, current sensors which determine current flowing through the electrical components, and a control system. The control system calculates and records error index values over an interval using the currents. The control system increments a first counter with every sample in the series, increments a second counter whenever a given error index value exceeds a calibrated high threshold, and decrements the second counter whenever the given error index value is less than a calibrated low threshold. A control action, e.g., recording a PASS or FAIL value, executes when either the absolute value of the second counter or the present value of the first counter reaches a corresponding limit or threshold. A method enhances the robustness of a hybrid vehicle torque security diagnostic using the control system. The vehicle and method use a signed X of Y debouncing or error signal processing method as noted above.

12 Claims, 2 Drawing Sheets

METHOD AND APPARATUS FOR ENHANCING THE ROBUSTNESS OF A HYBRID VEHICLE TORQUE SECURITY DIAGNOSTIC

TECHNICAL FIELD

The present invention relates to a method and an apparatus for enhancing the robustness of a hybrid vehicle torque security diagnostic.

BACKGROUND

Hybrid electric vehicles use a rechargeable energy storage system to supply electrical power to one or more high-voltage traction motors. The fraction motors alternately draw power from and deliver power to the energy storage system as needed. Motor torque from the traction motors can be used to propel the vehicle in an electric-only operating mode below a threshold vehicle speed. Above the threshold vehicle speed, engine torque from an internal combustion engine is used to propel the vehicle, either alone or in conjunction with motor torque from the traction motors. Vehicle torque security diagnostics or other error detection and analysis procedures are therefore implemented to ensure proper functioning of the vehicle.

SUMMARY

Accordingly, a hybrid electric vehicle (HEV) is disclosed herein. The HEV has a control system configured to execute a vehicle torque security diagnostic. In one embodiment, the torque security diagnostic includes a phase current sensor rationality check. Electrical current sensors measure different electrical currents aboard the HEV, e.g., from an energy storage system (ESS) and through a number of high-voltage electrical component, such as an auxiliary power module (APM) and a power inverter module (PIM). The error signals describing the net current flow with respect to a given circuit node are referred to herein as an error index.

In a distributed vehicle control network, signals representing the error index can be relatively noisy. Signal noise is largely due to a communication delay as the signals are passed via a controller area network (CAN) or other communications link within the distributed control network. The signal noise may produce a false fail situation when diagnosed using conventional software-based signal processing methods. The present approach thus provides a more robust treatment of the types of error signals typically encountered in a hybrid vehicle current sensor rationality diagnostic circuit.

In particular, a signed X-of-Y error processing or debouncing method is disclosed herein for use aboard an HEV. The present method may be embodied as computer code or instructions stored on and executable from a tangible computer-readable medium, e.g., a hard drive, read only memory (ROM), dynamic memory, etc., to thereby detect a consistent error sign in a given error index. In a phase current sensor rationality check embodiment, the error index can be calculated as an electrical current sum value ($I_{SUM}$), which is the sum of the battery or ESS current ($I_{ESS}$), the APM current ($I_{APM}$), and the PIM current ($I_{PIM}$). The error index should equal zero in a no-fault electrical condition, with a significant non-zero value potentially indicating an electrical fault.

The present method allows a designated X counter value, i.e., a fail counter, to be selectively decreased or decremented by an integer value of 1 if the error index signal has a value that is less than an error level corresponding to a lower threshold, referred to hereinafter as a fail-low threshold (FLT). A separate Y counter records the number of samples, and is increased or incremented by an integer value of 1 with every sample. As used herein, the terms "increment" and "decrement" are active verbs indicating a respective increase/addition to and decrease/decrement from a recorded counter value, as is customary in computer-related arts. Each counter has a calibrated limit, abbreviated herein as $Y_{LIMIT}$ and $X_{LIMIT}$. The present diagnostic method includes recording a FAIL result when the absolute value of the value recorded by the X counter equals the corresponding calibrated X counter limit ($X_{LIMIT}$) A PASS result is likewise recorded if the Y counter reaches its calibrated limit ($Y_{LIMIT}$) before $|X|=X_{LIMIT}$. Further control actions may be taken as needed depending on the results of the diagnostic.

A vehicle is also provided that includes high-voltage electrical components arranged in a circuit aboard the vehicle, current sensors each to determine electrical current flowing through different ones of the electrical components, and a control system. The control system calculates and records a series of error index values over a calibrated interval using the electrical currents. The control system then increments a first counter, i.e., the Y counter noted above, with every sample in the series, increments a second counter, i.e., the X counter noted above, whenever a given error index value is equal to or greater than a calibrated high threshold, and decrements the second/X counter when the error index value is less than a calibrated low threshold. A control action is initiated, e.g., a PASS or FAIL value is recorded, when either the absolute value of the second/X counter or the present value of the first/Y counter reaches a corresponding limit or threshold value.

The above features and advantages and other features and advantages of the present invention are readily apparent from the following detailed description of the best modes for carrying out the invention when taken in connection with the accompanying drawings.

DESCRIPTION

Figure 1:
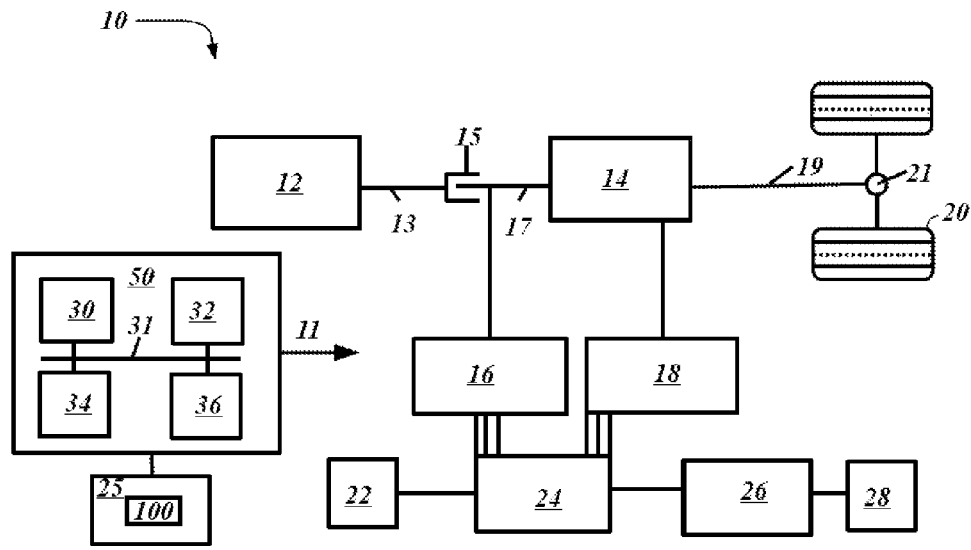
FIG. 1 is a schematic illustration of a vehicle having a distributed control system for a vehicle, wherein the control system executes an error signal processing or signed X of Y debouncing method as disclosed herein.

Referring to the drawings, wherein like reference numbers correspond to like or similar components throughout the several figures, a vehicle 10 is shown in FIG. 1. The vehicle 10 includes a control system 50. The control system 50 uses a distributed control network, wherein multiple vehicle control modules communicate via associated communication busses and routing protocols to maintain control over associated vehicle operations via a set of control signals 11. Vehicle control modules may include, but are not necessarily limited to, a pair of motor control processors (MCP) 30 and 32, a battery control module (BCM) 34, and a vehicle integration control module (VICM) 36. The MCP 30 and 32 communicate with the BCM 34 and the VICM 36 over a controller area network (CAN) bus 31, only part of which is shown in FIG. 1 for simplicity.

The control system 50 includes a host machine 25, e.g., a central processing unit, memory, etc., that is operable for executing a torque security diagnostic method 100. The present method 100, which is described below with reference to FIG. 4, can be embodied as computer code or procedural instructions and stored on a tangible computer readable medium, for example read only memory (ROM), static or dynamic memory, flash memory, or a magnetic or electro-optical disc. The method 100 is then executed by designated hardware components of the host machine 25. Execution of the present method 100 provides a signed X of Y error debouncing procedure or error signal processing diagnostic for use in onboard torque security diagnostics, as set forth below with reference to FIGS. 3 and 4.

In one possible embodiment, the vehicle 10 of FIG. 1 may be configured as a hybrid electric vehicle (HEV) having one or two high voltage traction motors 16 and 18. The MCP 30, 32 noted above are configured to control the speed, mode, and operation of the respective traction motors 16 and 18. Motor output torque is transmitted by the traction motors 16, 18 to an input member 17 of a transmission 14. Torque may also be selectively generated using an internal combustion engine 12, which may be started using one of the motors 16 or 18 above a threshold vehicle speed. A crankshaft 13 of the engine 12 selectively drives the input member 17 of the transmission 14 via an input clutch and damper assembly 15. That is, the assembly 15 may be configured for selectively connecting the engine 12 to the transmission 14 and for mechanically damping pulsations or oscillations of the engine, as is well understood in the art.

An output member 19 of the transmission 14 is connected to a set of drive wheels 20, which may be front or rear wheels depending on the vehicle design. The wheels which may be connected with respect to each other via a differential 21. Output torque from the transmission 14 ultimately rotates the wheels 20 to propel the vehicle 10 in a variety of drive modes, e.g., electric-only, fixed gear, input/output split, etc., depending on the vehicle design.

The traction motors 16 and 18 may be embodied as multi-phase permanent magnet or AC induction machines each rated for approximately 60 volts to approximately 300 volts or more depending on the vehicle design. The traction motors 16 and 18 are each electrically connected to a rechargeable energy storage system (ESS) 22 via a high-voltage DC bus bar and a power inverter module (PIM) 24. The ESS 22 may be selectively recharged using torque from the motors 16, 18 when the motors are actively operating as generators, e.g., by capturing energy during a regenerative braking event.

Other high-voltage electrical components of vehicle 10 may include an auxiliary power module (APM) 26, e.g., a DC-DC power converter. The APM 26 may be electrically connected to a low-voltage auxiliary battery 28, e.g., a 12-volt DC battery, via a low-voltage bus bar, and configured for energizing one or more auxiliary systems aboard the vehicle 10 such as lights, a radio, etc.

Figure 2:
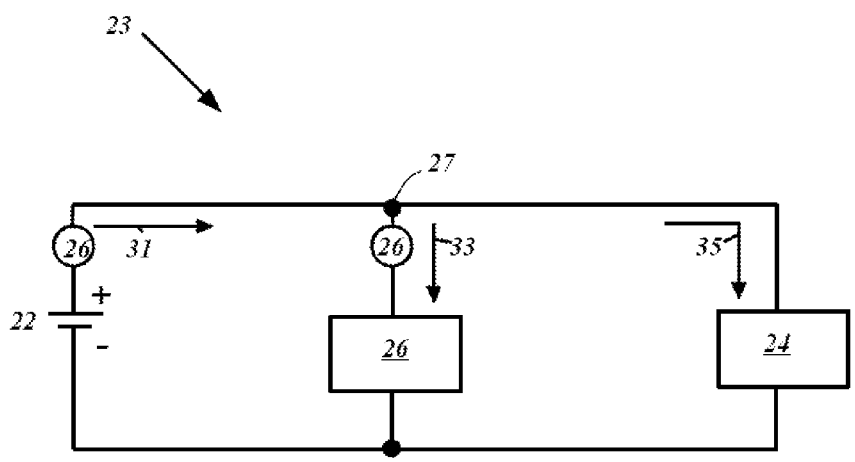
FIG. 2 is a schematic circuit diagram illustrating a phase current rationality calculation performed by the control system of the vehicle shown in FIG. 1.

Referring to FIG. 2, an electrical circuit 23 is shown schematically for the various electrical currents that may be considered during a current sensor rationality check aboard the vehicle 10. As noted above, the ESS 22, the PIM 24, and the APM 26 are used to power the traction motors 16 and 18 of FIG. 1, or as many motors as are used in the particular vehicle design. The proper flow of electrical current through the circuit 23 is diagnosed according to a calibrated control cycle or loop, e.g., every 12.5 ms in one possible embodiment, using measurements collected by electrical current sensors 26.

The electrical current sensors 26 are positioned as needed within the electrical circuit 23 to properly measure or otherwise help calculate a net current flow with respect to a given circuit node. For example, consider the circuit node 27 shown in FIG. 2. The battery current ($I_{ESS}$) (arrow 31) flowing into node 27 must equal the total current flowing out of the same node and into the PIM 24 and APM 26. Mathematically, $I_{ESS} = -(I_{APM} + I_{PIM})$, with the value $I_{APM}$ represented in FIG. 2 by arrow 33 and the value $I_{PIM}$ represented by arrow 35.

Likewise, the sum of the three electrical current values should equal zero, i.e., $I_{SUM} = I_{ESS} + I_{APM} + I_{PIM} = 0$. The value $I_{SUM}$ therefore can be used as a suitable error index when executing the present method. To ensure that the electrical current values read by sensors 26 are indeed correct and expected, the balance of the current flow may be closely monitored in control loop having a suitably high sampling frequency, with samples being read and calculated as needed for the various current values noted above in each loop. A current sensor rationality check of this type helps to prevent the use of incorrect electrical current information in any subsequent motor torque calculation.

During special operating mode changes, e.g., during engine pulse cancellation, the motor torque commands from the MCP 30 or 32 of FIG. 1 can change very quickly. The latency in transmission of a battery current ($I_{ESS}$, or arrow 31) can cause large $I_{SUM}$ errors. For example, because the communication speed across the CAN bus 31 of FIG. 1 can be approximately 25 ms, a communication delay in reading the battery current ($I_{ESS}$) value or other current values may be late by as much as 50 ms when calculating an error signal, which exemplifies the latency noted above.

Therefore, the present diagnostic method can be used to build a suitable diagnostic error function, $f(v)$. In turn, the error function $f(v)$ can be used to determine whether there is a failed current sensor in the electrical circuit 23 of FIG. 2, or merely a false error result. For vehicle torque security purposes, the error function $f(v)$ may be calibrated to a standard such as a 0.2 g/200 ms torque standard, i.e., 0.2 times the gravitational acceleration value (g) of 9.8 m/s$^2$, i.e., +/−1.96 m/s$^2$ of extra unintended acceleration in a 200 ms period. Such a standard is well known in the art, although other acceleration standards may also be used when executing the present method 100.

Commonly used error processing methods may be less than optimal in terms of the robustness or the ability to withstand changing circumstances, particularly when used aboard certain HEV powertrains. For example, a conventional X of Y diagnostic method can easily fail during non-sustained fault conditions, including in a belted alternator-starter (BAS) hybrid current rationality check. To have a consistent torque error, the acceleration or deceleration must be sustained, for otherwise the acceleration and deceleration will balance each other out.

Figure 3:
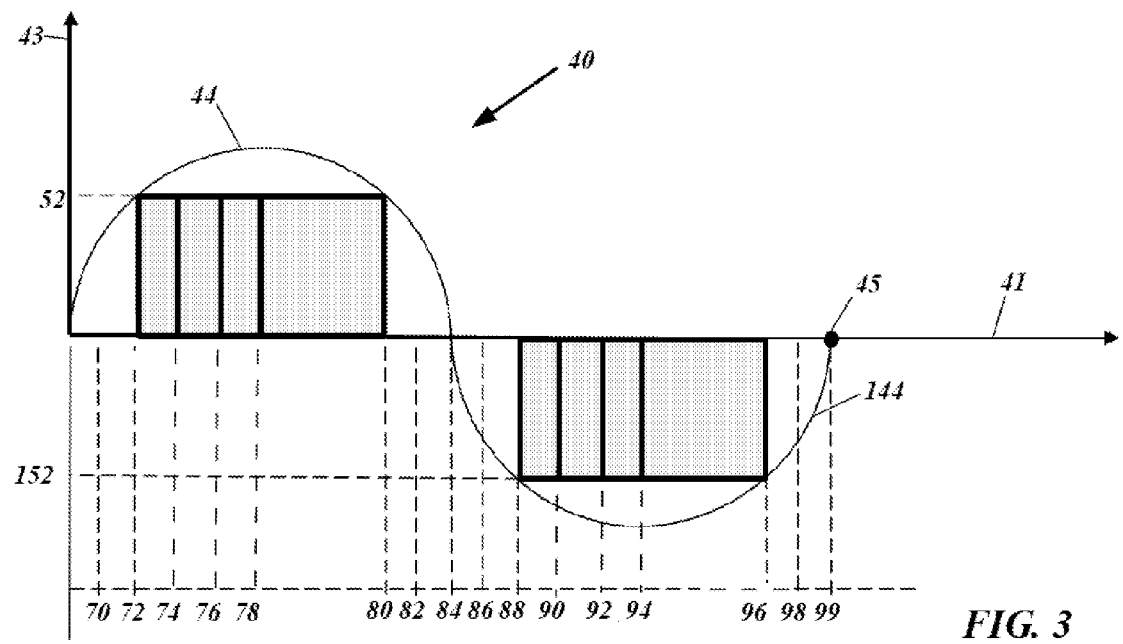
FIG. 3 is a schematic illustration of a set of error measurements used during execution of the present method.

Referring to FIG. 3, the present method 100 provides a signed X of Y debouncing method for processing an error signal in the vehicle 10 shown in FIG. 1. The present method can be briefly explained with reference to an error sample plot 40. In the error sample plot 40, the horizontal axis 41 represents the time interval over which the various samples, measurements, or other signal observations are collected and analyzed. The vertical axis 43 represents the output value of the error function, i.e., $f(v)$. The value of this function is referred to herein as the error index (I). The error index (I) may be the $I_{SUM}$ value in any phase current rationality check as explained above with reference to FIG. 2. Also as explained above, the $I_{SUM}$ value should equal zero in a no-fault condition, with a substantial non-zero residue resulting in a possible fault condition.

A calibrated "fail high" threshold (FHT) 52 is used in conjunction with a calibrated "fail low" threshold (FLT) 152 to define the allowable boundaries or limits of any detected error. The FHT 52 and FLT 152 can be any calibrated thresholds. In the embodiment noted above, a 0.2 g/200 ms torque threshold may be used to evaluate an $I_{SUM}$ error that could produce a motor torque error having 0.2 g of unintended acceleration in a 200 ms interval. The data points 70-78, 80-88, and 90-99 shown in FIG. 4 represent illustrative time points corresponding to various error samples during a positive torque period (error trace 44) and a negative torque period (error trace 144).

All of the data points 70-99 represent samples of the error traces 44 or 144. That is, the data points 70, 72, 74, 76, and 78 represent the first five samples, i.e., Y=1, 2, 3, 4, and 5, respectively. Data points 72, 74, 76, and 78 correspond to the failed samples, i.e., X=1, 2, 3, and 4, respectively. In other words, sample Y=1 corresponds to no error, and samples Y=2 through n+1 (data point 80) each corresponds to an error value. Data point 84 completes the positive torque period (error trace 44), and no error is found at this point.

In the negative torque period represented by error trace 144 and beginning at data point 84, additional samples are taken and recorded beginning with data point 84 and finishing at data point 99. No error value is returned at either of the data points 84 and 86, i.e., at Y=n+3 and Y=n+4, respectively. This changes at data point 88, i.e., Y=n+5. Data points 90, 92, 94, and 96 all return error values. Note that the error trace 144 between points 88 and 96 falls below the FLT 152. Unlike conventional X of Y debouncing methods, the present signed X of Y method 100 does not increment the X counter when error values less than the FLT 152 are recorded. Instead, the data point 88 produces a value of X=n−1, meaning the X counter decrements by an integer value of 1. The data points 90, 92, 94, and 96 continue in the same manner, producing value for the X counter as X=n−2, n−3, n−4, and n−m, respectively. The data point 99 corresponds to the calibrated sample limit ($Y_{LIMIT}$) noted above. Sampling is finished when $Y_{LIMIT}$ is reached, and a result is entered as described below.

Figure 4:
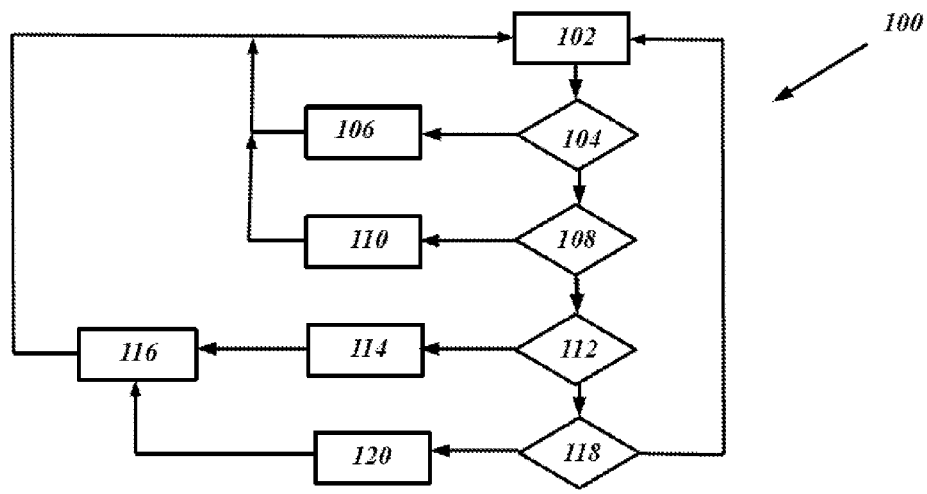
FIG. 4 is a flow chart describing an embodiment of the present method.

Referring to FIG. 4, the present diagnostic method 100 can be used to quickly detect a sustained or same-signed fault. For a non-sustained fault, method 100 allows an indicated excessive acceleration and deceleration to balance themselves out. The values $X_{LIMIT}$ and $Y_{LIMIT}$ used below can follow a standard, such as the 0.2 g/200 ms standard noted above or any other suitable standard. By picking up only a sustained error signal of a sufficiently high magnitude, method 100 can provide a more robust approach to processing errors in the execution of a vehicular torque security diagnostic.

Beginning with step 102, the diagnostic error index (I) is calculated using a calibrated $f(v)$ function. In the phase current rationality check embodiment mentioned above, step 102 can include calculating the $I_{SUM}$ value as this function. That is, $I_{SUM}=I_{ESS}+I_{APM}+I_{PIM}$. At step 104, the calculated error index (I) from step 102 is compared to the FHT 52 shown in FIG. 3. The method 100 proceeds to step 106 when the error index (I) is greater than or equal to the FHT 52. Otherwise, the method 100 proceeds to step 108.

At step 106, two different integer counters (X and Y) are incremented, and the method 100 repeats step 102. As understood in the art, an X of Y diagnostic determines the number of failures (X) in a given test window or sample period (Y). Therefore, the designated Y counter records the number (Y) of collected test samples. The Y counter has a calibrated limit ($Y_{LIMIT}$). Upon reaching the calibrated limit ($Y_{LIMIT}$), which is represented by data point 99 in the illustrative example of FIG. 3, a PASS or FAIL decision can be recorded and acted on as set forth below.

The X counter is the fail counter. The X counter holds the total number (X) of failed samples during a given test window. For example, in a phase current rationality check, a sample of the current sum value ($I_{SUM}$) may be recorded every 12.5 ms. If the current sum exceeds a calibrated threshold, e.g., 100A, it is deemed a FAIL sample, and the X counter increments by an integer value of 1. The X counter has a calibrated limit ($X_{LIMIT}$). Upon reaching the calibrated limit ($X_{LIMIT}$), the diagnostic records a FAIL result, and a suitable control action can be initiated as noted below.

At step 108, the error index (I) is compared to the FLT 152 of FIG. 3. Step 110 is executed if the error index (I) is less than or equal to the value of the FLT 152, wherein the Y counter is incremented, i.e., Y=Y+1, and the X counter is decremented, i.e., X=X−1. The method 100 proceeds to step 112 if the value of the error index (I) exceeds the value of the FLT 152.

At step 112, having determined at previous steps 104 and 108 that the error index (I) falls somewhere between the FHT 52 and the FLT 152 in FIG. 3, the Y counter is incremented by an integer value of 1, i.e., Y=Y+1, and the method 100 proceeds to step 114.

At step 114, the absolute value of the X counter (|X|) is compared to a calibrated failure limit, i.e., $X_{LIMIT}$. If |X| exceeds the calibrated limit ($X_{LIMIT}$), a FAIL result is recorded at step 114, and the method 100 proceeds to step 116. Otherwise, the method 100 proceeds to step 118.

At step 116, the values of the X and Y counters are zeroed such that X=0 and Y=0. Step 102 is then repeated.

At step 118, the value of the Y counter is compared to its calibrated limit ($Y_{LIMIT}$). If Y≥$Y_{LIMIT}$, step 120 is executed, whereby a PASS result is recorded. The method proceeds to step 116. Otherwise, the method 100 repeats step 102.

Accordingly, by executing the present method 100 aboard the vehicle 10 shown in FIG. 1, sustained or same-signed faults can be quickly detected. For a non-sustained fault, the method allows any indicated excessive acceleration and deceleration to balance out. Unintended oscillating error index signals can thus be filtered, and increased robustness is enabled by detecting only sustained high-magnitude error signals.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a plurality of high-voltage electrical components arranged in an electrical circuit aboard the vehicle;
   a plurality of electrical current sensors each configured to determine a corresponding electrical current through a different one of the high-voltage electrical components; and
   a control system configured to enhance the robustness of a hybrid vehicle torque security diagnostic by calculating and recording a series of error index values over a calibrated sample interval using the corresponding electrical currents from the sensors, with the corresponding electrical currents being used by the control system to calculate values used in the torque security diagnostic;
   wherein the control system includes a first counter and a second counter, and is further configured to:

increment the first counter with each error index value that is recorded during the calibrated sample interval;

increment the second counter whenever a given one of the error index values that is recorded during the calibrated sample interval is greater than a calibrated fail high threshold corresponding to an electrical current level sufficient for generating a torque error corresponding to a predetermined amount of unintended acceleration of the vehicle;

decrement the second counter whenever a given one of the error index values that is recorded during the calibrated sample interval is less than a calibrated fail low threshold corresponding to an electrical current level sufficient for generating another torque error corresponding to a predetermined amount of unintended deceleration of the vehicle; and execute a control action when either the absolute value of the second counter or the value of the first counter reaches a corresponding limit.

2. The vehicle of claim 1, wherein the high-voltage electrical components include a rechargeable energy storage system, a power inverter module, and an auxiliary power module.

3. The vehicle of claim 2, wherein each error index value in the series of error index values is calculated via the control system as a sum of a first electrical current flowing through the energy storage system, a second electrical current flowing through the auxiliary power module, and a third electrical current flowing through the power invert module.

4. The vehicle of claim 2, wherein:

the plurality of electrical current sensors includes a first current sensor positioned to measure the electrical current flowing through the energy storage system and a second current sensor positioned to measure the electrical current flowing through the auxiliary power module; and the control system is configured to calculate the electrical current flowing through the power inverter module as a function of the electrical current flowing through the auxiliary power module and the electrical current flowing through the power inverter module.

5. The vehicle of claim 1, wherein the control system is configured to execute the control action by recording a FAIL result when the absolute value of the second counter reaches the corresponding limit for the second counter, and by recording a PASS result when the value of the first counter reaches corresponding limit for the first counter.

6. The vehicle of claim 1, wherein the predetermined amount of unintended vehicle acceleration is approximately 1.96 m/s$^2$, and wherein the predetermined amount of unintended vehicle deceleration is approximately −1.96 m/s$^2$.

7. A method for enhancing the robustness of a hybrid vehicle torque security diagnostic, the method comprising:

determining a corresponding electrical current flowing through each of a plurality of high-voltage electrical components using a plurality of electrical current sensors, wherein the corresponding electrical currents are used by a control system in the hybrid vehicle torque security diagnostic;

calculating and recording a series of error index values over time, wherein the error index values are calculated as a function of the corresponding electrical currents;

incrementing a first counter via a host machine of a control system with every sample in the series of error index values;

incrementing a second counter via the host machine whenever a given one of the error index values is greater than a calibrated high threshold;

decrementing the second counter via the host machine when the error index value is less than a calibrated low threshold;

correlating the calibrated high threshold and the calibrated low threshold with an electrical current level sufficient for generating a torque error corresponding to a predetermined amount of unintended vehicle acceleration and a predetermined amount of unintended vehicle deceleration, respectively; and executing a control action when either the absolute value of the second counter or the value of the first counter reaches a corresponding limit.

8. The method of claim 7, wherein the vehicle includes a rechargeable energy storage system, a power inverter module, and an auxiliary power module, and wherein determining a corresponding electrical current includes:

determining an electrical current flowing through the rechargeable energy storage system, through the power inverter module, and through the auxiliary power module.

9. The method of claim 8, wherein each error index value in the series of error index values is calculated via the control system as a sum of a first electrical current flowing through the energy storage system, a second electrical current flowing through the auxiliary power module, and a third electrical current flowing through the power inverter module.

10. The method of claim 7, wherein t executing a control action includes:

recording a FAIL result when the absolute value of the second counter reaches the corresponding limit for the second counter; and recording a PASS result when the value of the first counter reaches the corresponding limit for the first counter.

11. The method of claim 7, further comprising:

using a first current sensor to measure the electrical current flowing through the energy storage system;

using a second current sensor to measure the electrical current flowing through the auxiliary power module; and calculating, via the host machine of the control system, the electrical current flowing through the power inverter module as a function of the electrical current flowing through the auxiliary power module and the electrical current flowing through the energy storage system.

12. The method of claim 7, wherein the predetermined amount of unintended vehicle acceleration is approximately 1.96 m/s$^2$, and wherein the predetermined amount of unintended vehicle deceleration is approximately −1.96 m/s$^2$.

* * * * *